United States Patent [19]

Lambros et al.

[11] 4,398,454

[45] Aug. 16, 1983

[54] AESTHETIC WHISTLING COFFEEPOT

[76] Inventors: Emanuel E. Lambros, 40 - 11th St.; James H. Wolfston, P.O. Box 3100, both of Wheeling, W. Va. 26003

[21] Appl. No.: 211,860

[22] Filed: Dec. 1, 1980

[51] Int. Cl.³ .............................................. A47J 31/46
[52] U.S. Cl. ....................................... 99/285; 99/314; 126/388
[58] Field of Search ................ 99/287, 285, 299, 300, 99/342, 344, 307, 308, 309, 310, 311, 312, 313, 314, 315; 126/388

[56] References Cited

U.S. PATENT DOCUMENTS

| | | |
|---|---|---|
| 45,787 | 1/1865 | Young . |
| 95,959 | 10/1869 | Warner . |
| 579,666 | 3/1897 | Wigginton . |
| 1,008,602 | 11/1911 | Lake . |
| 1,624,606 | 4/1927 | Lane . |
| 1,699,303 | 1/1929 | Mennicke ............................. 99/285 |
| 2,630,113 | 3/1953 | Zide . |
| 2,817,285 | 12/1957 | Terce . |
| 3,077,156 | 2/1965 | Egi ...................................... 99/285 |
| 4,137,832 | 2/1979 | Lambros .............................. 99/285 |

FOREIGN PATENT DOCUMENTS 694855  9/1964  Canada .................................. 99/285

*Primary Examiner*—Robert W. Jenkins
*Attorney, Agent, or Firm*—Cushman, Darby & Cushman

[57] ABSTRACT

A coffeepot is provided having a whistle and pouring opening located in a skirt depending from the lid. The lid is rotatable within the pot to bring the whistle and pouring opening into communication with a pouring spout, or so that they are blocked by the pot sidewall. A basket having upper and lower steel filters of fine mesh is supported spaced from, but adjacent, the coffeepot bottom for ensuring immersion of the coffee within the water during the brewing cycle.

11 Claims, 3 Drawing Figures

AESTHETIC WHISTLING COFFEEPOT

BACKGROUND AND SUMMARY OF THE INVENTION

The invention relates to a coffeepot of an aesthetic appearance having structures associated therewith that provide an audible indication of the progress that coffee is making while reducing the quantity of coffee grounds required in the brewing phase. One proposal for providing a coffeepot that enhanced coffee flavor while minimizing the quantity of coffee required in brewing and having an audible indicator of when the water in the pot started to boil is shown in U.S. Pat. No. 4,137,832. The coffeepot shown in U.S. Pat. No. 4,137,832, while having great practical utility, possesses a slight drawback in that it lacks an entirely aesthetic appearance because the whistle is a visible external element.

Accordingly, the present invention relates to a coffeepot having an aesthetic appearance which includes a whistle to produce an audible signal that indicates when the water in the coffeepot has started to boil. The whistle remains entirely out of sight and thus does not mar the exterior appearance of the coffeepot.

The whistle and a pouring hole are located on a skirt depending from the coffeepot lid wherein the skirt depending from the lid has a smaller outer diameter than the inner diameter of the coffeepot. The lid and the depending skirt sit in the opening at the coffeepot top so that the lid and associated depending skirt may be selectively rotated from a position wherein the whistle and pouring hole are in operative communication with the pouring spout to a position wherein neither the whistle nor the pouring hole communicates with the pouring spout. Rotating the lid and depending skirt to the latter position reduces heat losses thereby keeping the coffee within the pot warm. Locating the whistle on the skirt depending from the lid preserves the overall aesthetic external appearance of the coffeepot of the present invention.

Also according to the present invention, internal structural features are provided that enhance the coffee flavor while greatly reducing the amount of coffee grounds required in the brewing cycle. In particular, a centrally located rod or tube extends from the open end of the coffeepot to and connects with a filter basket having removable metal filter elements on top and bottom. Either depending from the lower filter element or extending upwardly from the coffeepot bottom are a plurality of supporting members. These support members space the filter basket containing coffee grounds away from the coffeepot bottom so that coffee grounds contained within the filter basket remain immersed in the water during the brewing cycle. Totally immersing the coffee grounds allows the boiling water to flow through the filter basket containing the coffee grounds thereby leading to coffee ground savings of approximately to 20–60% or more as compared to coffeepots lacking this internal structural arrangement.

It is the primary object of the present invention to provide an improved coffeepot having an aesthetic appearance. This and other objects of the invention will become clear from an inspection of the detailed description of the invention, and from the appended claims.

DETAILED DESCRIPTION OF THE DRAWINGS

Figure 1:
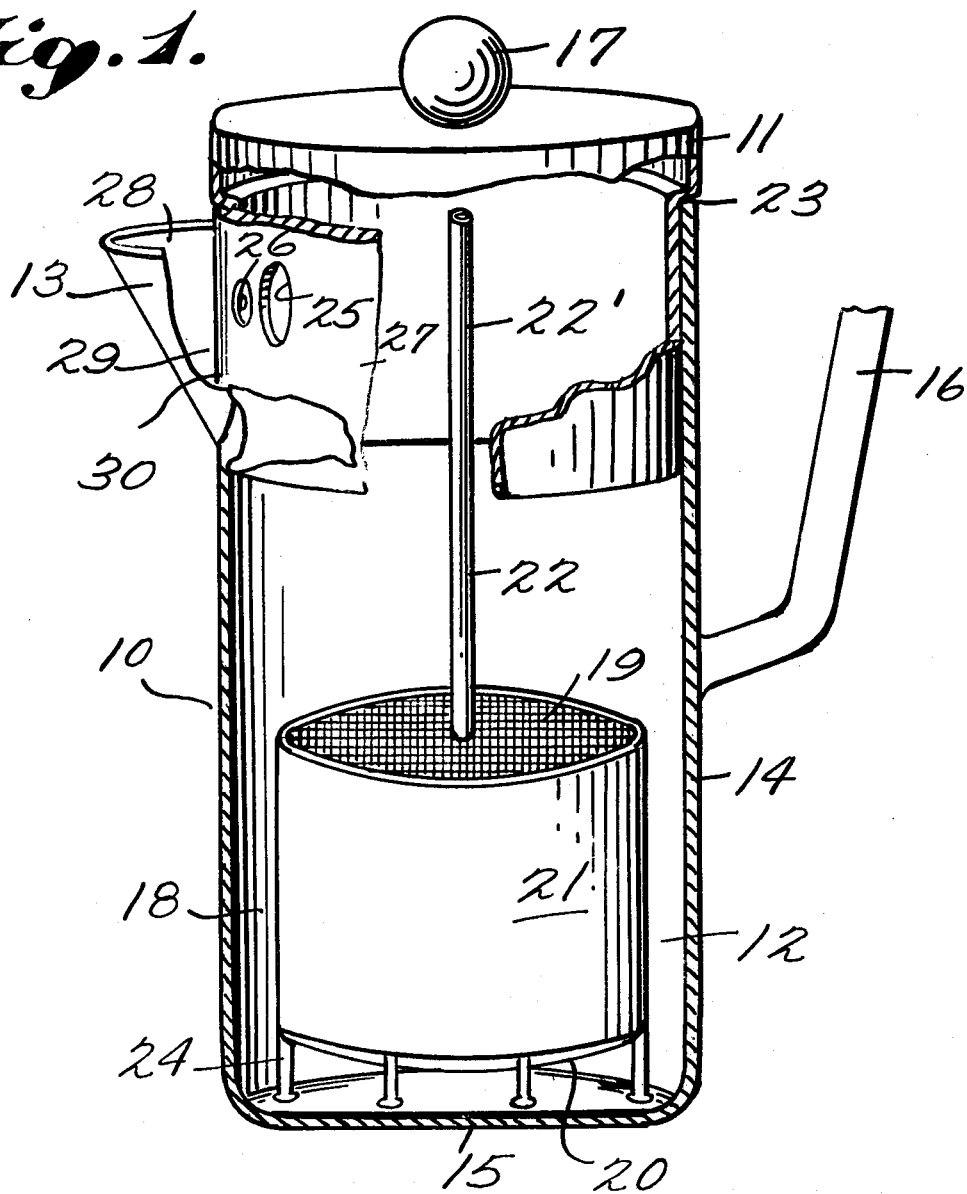
FIG. 1 shows in a partial exploded side view an exemplary coffeepot according to the present invention with the pot side wall and pouring spout cut-away to illustrate the interior components.
Figure 3:
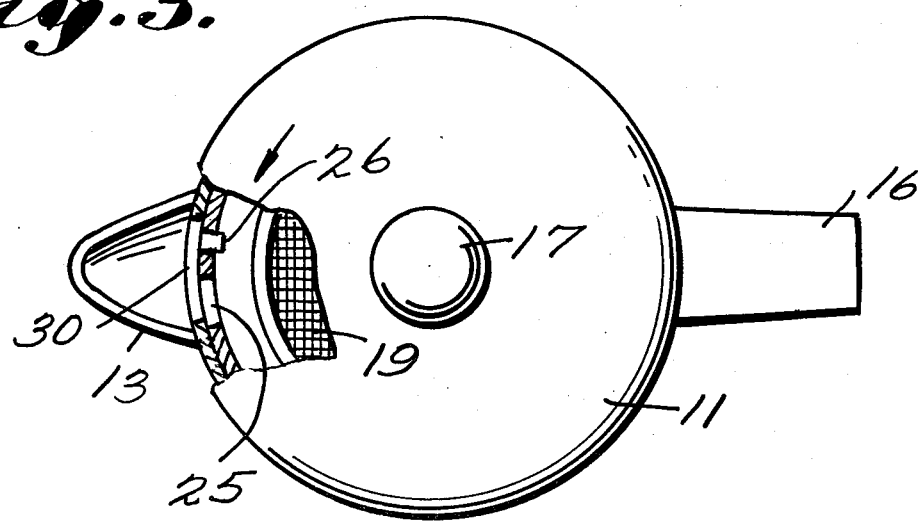
FIG. 3 is a top plan view of an exemplary coffeemaker according to the instant invention showing the relationship between the pouring spout and the pouring hole and whistle.

FIG. 1 shows a coffeemaker 10 with associated lid 11. The coffeepot 12 itself includes pouring spout 13, circumferentially continuous side wall 14, bottom 15 and open top 14'. Lid 11 is provided for closing the open top 14' of coffeepot 12. Handle 16 is attached to the external side wall portion on the opposite side of coffeepot 12 from the pouring spout 13. Dome 17, located centrally on lid 11 and handle 16, may be constructed from non-heat conducting material. In the alternative, handle 16 may be wrapped with a non-heat conducting material. The non-heat conducting dome 17 enables the user of the coffeemaker of the instant invention to remove or rotate lid 11 without receiving minor burns and also enable the user of the instant invention to grasp handle 16 safely while pouring coffee out the pouring spout 13.

In the partially exploded portion of the coffeepot 12, shown in FIG. 1, an advantageous filter basket 18 is illustrated. Filter basket 18 may have metal (e.g., stainless steel) filter elements on its top and bottom. The top filter element 19 may snap or screw into place. The bottom filter element 20 may likewise be removable but preferably is permanently affixed to the circumferentially continuous side wall 21 of filter basket 18. The top filter element 19 and bottom filter element 20 may be planar across the top and bottom surfaces of the filter basket or may have a slight outward bubble. Typically, the top filter element 19 and bottom filter element 20 have between 2500 and 3000 openings per square inch. The fineness of the openings in the filter elements 19 and 20 prevents the coffee grounds contained within filter basket 18 from contaminating the coffee being brewed.

A lift-out element 22 is attached to top filter element 19 of the filter basket 18. Lift-out element 22 enables the filter basket 18 to be placed into an operative position for brewing coffee or to be easily removed for cleaning or replacement of the coffee grounds contained within the filter basket 18. The lift-out member 22 may be centrally located on the top filter element 19 and extends upwardly therefrom towards the open end of the coffeepot 12 of the instant invention. Preferably the lift-out member 22 should extend slightly above the lip 23 of coffeepot 12. Lift-out member 22 may be a hollow tube or a solid rod or a flat solid metal bar. A hollow tube lift-out member also may open to the interior of filter basket 18 to permit percolation during coffee brewing. In any case, lift-out member 22 preferably has a non-heat conducting portion 22' located for easy grasping near the open end of the coffeepot.

The filter basket 18, having a cross-sectional diameter slightly less than that of the coffeepot 12, rests upon a plurality of supporting elements 24. These supporting elements 24 comprise support legs that are affixed either to the bottom filter element 20 itself or to a band running around the circumference of the filter basket 18 where the circumferentially continuous side wall 21 joins the bottom filter element 20. The support members 24 are of sufficient length to prevent the bottom filter element 20 from contacting the bottom 15 of the coffeepot 12. By preventing this contact, yet locating basket 18 near bottom 15, the filter basket 18 remains completely immersed while brewing coffee thereby resulting in substantial coffee ground savings.

FIG. 1 shows the pouring hole 25 and whistle 26 located on the skirt 27 attached and depending from lid 11 in alignment with the corresponding opening in the coffeepot side wall 14 around which the pouring spout 13 is formed. Preferably pouring hole 25 and whistle 26 may be horizontally spaced from each other while at the same vertical distance from lid 11. Pouring hole 25 may be larger than the opening for the whistle 26. Whistle 26 may be of any suitable conventional type.

By selectively rotating the lid 11 and the associated and attached and depending skirt 27 from a first position—wherein the pouring hole 25 and whistle 26 are in operative communication through a corresponding opening in the side wall 14 of pot 12 to the pouring spout 13—to a second position—wherein neither the pouring hole 25 nor the whistle 26 communicate with the pouring spout—flow of coffee from pot 10 through spout 13 is controlled. In the operative or first position, the whistle indicates when the water in the pot is boiling by audibly releasing built-up steam from pot 12. In the second position, the brewed coffee remains warm as the heat is trapped within the coffeemaker 10. The user could also easily rotate lid 11 to a third position to align either the whistle 26 or pouring hole 25 with pouring spout 13.

The pouring spout 13 has an opening 28 and spout wall 29 that slopes downwardly from opening 28 toward coffeepot side wall 14 and joins side wall 14 to form a continuous surface. At the bottom of the pouring spout is shelf 30. Shelf 30 is attached to and extends outwardly from coffeepot side wall 14 to join the inner face of the spout wall 29. Shelf 30 starts from a pot side wall 14 at a point slightly below or equal to the opening in the pot side wall that corresponds with the pouring spout 13. Shelf 30 prevents coffee from collecting in the bottom of the pouring spout 13 after coffee has been poured from the coffeemaker 10.

Figure 2:
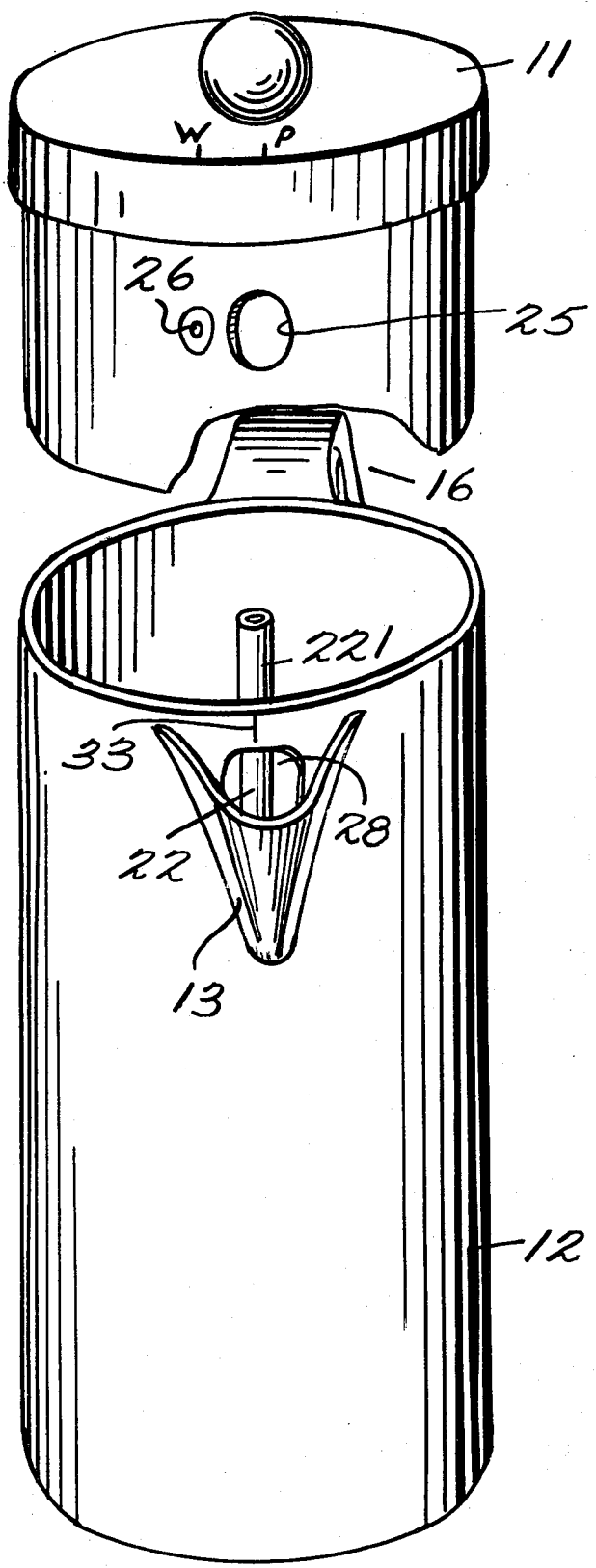
FIG. 2 is a front perspective exploded view of an exemplary coffeemaker according to the instant invention illustrating the relationship between the pouring hole and the whistle located on the skirt depending from the coffeepot lid to the coffeepot end associated pouring spout.

FIG. 2 shows an exemplary coffeemaker 10 according to the instant invention illustrating the relationship between the pouring hole 25 and the whistle 26 located on the skirt 27 depending from the coffeepot lid 11 to the coffeepot 12 and associated pouring spout 13.

The coffeepot lid 11 has a cross-sectional diameter slightly larger than that of coffeepot 12. However, the depending skirt 27 has a cross-sectional diameter just slightly smaller than the interior cross-sectional diameter of coffeepot 12. Therefore, when the lid 11 with the associated depending skirt 27 is placed into the pot opening 31, lid 11 rests snugly on the edge of the pot opening 31 which is defined by the circumferentially continuous side wall 14 of coffeepot 12. When placed into this position, the associated and depending skirt 27 fits tightly against the interior of the coffeepot side wall 14. This tight fit ensures that the whistle 26 will function properly.

The coffeepot lid 11 has indicia W that when aligned with the corresponding indicia 33 on the coffeepot side wall 14 ensures that the whistle 26 is properly aligned with the opening 28 in the coffeepot side wall surrounded by the pouring spout 13. Lid 11 also has indicia P that when aligned with indicia 33 ensures that pouring hole 25 is aligned with opening 28. By rotating the lid 11 to a position where both the pouring hole 25 and whistle 26 are no longer in alignment with opening 28 of coffeepot side wall 14, the heat is trapped within the coffeepot and coffee may not be poured through opening 28.

In utilizing the coffeemaker of the instant invention, lid 11 and the filter basket 18 are removed from the interior of coffeepot 12. The coffeepot 12 and filter basket 18 are checked for cleaniness since any accumulated dirt or grime will adversely affect coffee flavor. Filter basket 18 is removed from coffeepot 12. Water (preferably cold) is then placed within coffeepot 12. The top filter element 19 of filter basket 18 is removed, and the desired amount of coffee grounds, usually two ounces or less, are placed within the filter basket 18, the top filter element 19 is then replaced, and the filter basket 18 is lowered into position in the interior of coffeepot 12 using lift-out element 22. Lid 11 is re-seated in the open top 14' of pot 12 and rotated so that the whistle 26 is in operative communication with spout 13.

Coffeemaker 10 is then placed on a heat source, typically an electrical or gas burner, or if the coffeemaker 10 is equipped with electrical heating elements, it is plugged in. Once the water contained within coffeepot 12 commences boiling, steam will escape through the whistle 26 thereby providing an audible indication that boiling has commenced. Normally, after the whistling has started, the water is allowed to boil for another 3–4 minutes with the coffee strength increasing with boiling times greater than 3–4 minutes. At the end of the brewing cycle, the pot is removed from the heat source or if the pot is equipped with electrical heating means it is unplugged. The user may then grasp the non-heat conducting handle 16 and pour out the brewed coffee through the pouring hole 25. By grasping the non-heat conducting dome 17, the lid 11 may be selectively rotated to a second position where neither the whistle nor the pouring hole directly communicates to the pouring spout. In this second position, the heat is trapped within the coffeepot thereby keeping the coffee warm for later consumption.

Thus, it will be seen that according to the present invention, an improved coffeemaker having audible indicating means located in a position not visible from the exterior of the coffeepot has been provided. The coffeemaker, therefore, has a more aesthetic appearance. Additionally, the improved coffeemaker of the instant invention has an internal filter arrangement facilitating substantial coffee savings.

While the invention is herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:
1. A coffeemaker comprising:
   a pot having a closed bottom, a circumferentially continuous side wall, and an open top, and a handle extending from the side wall;
   a pouring spout extending from a portion of the exterior side wall opposite the handle;

a basket mounted in the pot for containing coffee, and having lift-out means extending upwardly therefrom toward the open top;

a lid for closing the open top and including a handle portion located centrally on top of the lid; said lid having a depending skirt portion with a smaller outside diameter than the inside diameter of the pot, and overlapping the pouring spout;

means defining a pair of openings in the depending skirt; and whistle means associated with one of said skirt openings, while the other opening remains free.

2. A coffeemaker as recited in claim 1 wherein said openings in said skirt are mounted so that both may be in communication with said pouring spout at the same time.

3. A coffeemaker as recited in claim 2 wherein said openings are at approximately the same vertical position but are circumferentially and horizontally spaced from each other.

4. A coffeemaker as recited in claim 2 and wherein said handle on top of said lid is of a non-heat conducting material; wherein said skirt is seated for rotation within said pot, so that said lid may be rotated from a position wherein both said whistle means on said pouring openings of said skirt communicate with said pouring spout to a position wherein neither said whistle means nor said pouring opening communicate with said pouring spout.

5. A coffeemaker as recited in claim 4 wherein said skirt depends downwardly from said lid so that after inserting said lid into the open top of said pot, said skirt fits snugly against said sidewall, said skirt ending at a point lower than said pouring spout relative to the bottom of said pot.

6. A coffeemaker as recited in claim 5 wherein said skirt and said pot have indicia for aligning said pouring opening and said whistle with said pouring spout.

7. A coffeemaker as recited in claim 6 wherein said pouring spout further comprises means for preventing the coffee being removed from said pot from collecting in the bottom of said pouring spout.

8. A coffeemaker as recited in claim 2 wherein said basket further comprises filter means on the top and bottom, circumferentially continuous side walls, a cross-sectional diameter less than a similar diameter across said coffeepot, and having a lift-out member attached to the top filter.

9. A coffeemaker as recited in claim 8 wherein said basket rests upon a plurality of support members extending upwardly from the bottom of said pot so that said basket never directly contacts the bottom of said pot and thereby remaining totally immersed in water during operation.

10. A coffeemaker as recited in claim 1 wherein said lift-out means further comprises a hollow tube located centrally on top of said basket, communicating with interior of said basket, and then extending upwardly from said basket towards the open top of said pot.

11. A coffeemaker as recited in claim 1 wherein said lift-out means further comprises a flat solid bar with one portion attached to the top of said basket, said bar having a second end with non-heat conducting material located rear of the open end of said pot.

* * * * *